(12) United States Patent
Qi et al.

(10) Patent No.: US 7,890,133 B2
(45) Date of Patent: Feb. 15, 2011

(54) MOBILE WIRELESS COMMUNICATIONS DEVICE PROVIDING PATTERN/FREQUENCY CONTROL FEATURES AND RELATED METHODS

(75) Inventors: Yihong Qi, Waterloo (CA); Ying Tong Man, Kitchener (CA); Perry Jarmuszewski, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 561 days.

(21) Appl. No.: 11/054,159

(22) Filed: Feb. 9, 2005

(65) Prior Publication Data

US 2006/0178116 A1 Aug. 10, 2006

(51) Int. Cl.
*H04M 1/00* (2006.01)
(52) U.S. Cl. ...................... 455/550.1; 455/73
(58) Field of Classification Search .............. 455/553.1, 455/575.7, 75, 88, 552.1, 101, 90.3
See application file for complete search history.

(56) References Cited

U.S. PATENT DOCUMENTS

| 5,532,708 | A | 7/1996 | Krenz et al. ................ 343/795 |
| 6,031,503 | A | 2/2000 | Preiss, II et al. ............ 343/770 |
| 6,404,394 | B1 | 6/2002 | Hill ............................ 343/702 |
| 6,476,769 | B1 | 11/2002 | Lehtola ....................... 343/702 |
| 6,549,170 | B1 | 4/2003 | Kuo et al. ................... 343/702 |
| 7,010,335 | B2* | 3/2006 | Peek ........................ 455/575.7 |
| 2002/0101377 | A1 | 8/2002 | Crawford .................... 343/702 |
| 2003/0013469 | A1* | 1/2003 | Forrester .................... 455/506 |
| 2004/0053582 | A1 | 3/2004 | Nakanishi et al. .......... 455/101 |
| 2004/0130496 | A1 | 7/2004 | Iijima et al. ................. 343/713 |
| 2004/0198473 | A1 | 10/2004 | Tran ........................ 455/575.1 |
| 2004/0204108 | A1* | 10/2004 | Etkin et al. ............... 455/562.1 |
| 2004/0235515 | A1* | 11/2004 | Kao ........................ 455/552.1 |
| 2005/0058111 | A1* | 3/2005 | Hung et al. ................. 370/338 |
| 2005/0168314 | A1* | 8/2005 | Alexopoulos et al. ....... 336/223 |

FOREIGN PATENT DOCUMENTS

| EP | 1052785 | 11/2000 |
| WO | 97/24818 | 7/1997 |
| WO | 01/31734 | 5/2001 |

* cited by examiner

*Primary Examiner*—Yuwen Pan
*Assistant Examiner*—Ankur Jain
(74) *Attorney, Agent, or Firm*—Allen, Dyer, Doppelt, Milbrath & Gilchrist, P.A.

(57) ABSTRACT

A mobile wireless communications device may include a portable housing, a wireless transceiver carried by the portable housing, and a plurality of antennas also carried by the portable housing. Each antenna may have a different gain pattern at a different respective operating frequency, and the antennas may have different shapes to define different gain patterns at a given operating frequency. The mobile wireless communications device may further include a frequency/pattern diversity controller for controlling the wireless transceiver to preferentially operate with the plurality of antennas.

14 Claims, 5 Drawing Sheets

MOBILE WIRELESS COMMUNICATIONS DEVICE PROVIDING PATTERN/FREQUENCY CONTROL FEATURES AND RELATED METHODS

FIELD OF THE INVENTION

The present invention relates to the field of communications systems, and, more particularly, to wireless communications systems and related methods.

BACKGROUND OF THE INVENTION

Computers are often connected together as part of a Local Area Network (LAN). The LAN permits computers to share data and programs with one another. Many typical LANs are based upon physical connections between individual computers and a server, for example. The connections may be twisted pair conductors, coaxial cables, or optical fibers, for example.

There is also another class of LAN based upon wireless communication to the individual computers. A wireless LAN is not restricted to having physical connections to the individual computers. Accordingly, original installation may be simplified. Additionally, one or more of the computers may be used in a mobile fashion. In other words, the user may use a laptop computer and move from place to place while still being connected via the wireless LAN.

Various standards have been created to define operating protocols for wireless LANs, such as the IEEE 802.11 and Bluetooth standards. The IEEE 802.11 standard, for example, defines the protocol for several types of networks including ad-hoc and client/server networks. An ad-hoc network is a network where communications are established between multiple stations in a given coverage area without the use of an access point or server. The standard provides methods for arbitrating requests to use the medium to ensure that throughput is maximized for all of the users in the base service set.

The client/server network uses an access point that controls the allocation of transmit time for all stations and allows mobile stations to roam from one access point to another. The access point is used to handle traffic from the mobile radio to the wired or wireless backbone of the client/server network. This arrangement allows for point coordination of all of the stations in the basic service area and ensures proper handling of the data traffic. The access points route data between each station and other wired/wireless stations, or to and from the network server (i.e., a base station). Of course, two or more LANs may be interconnected using wireless LAN devices at respective access points. This may be considered a network bridge application.

One of the challenges of wireless LAN implementation is designing suitable antennas that can provide desired performance characteristics, yet are relatively small in size to fit within mobile devices. For example, with wireless LAN devices such as laptop computers, it is desirable to keep the overall size of the laptop as small as possible. Furthermore, internal antennas are generally preferred over external antennas, as externally mounted antennas take up more space and are generally more acceptable to damage while traveling, etc.

One example of a wireless LAN antenna that is implemented on a PMCIA card to be inserted in a PMCIA slot of a laptop computer is disclosed in U.S. Pat. No. 6,031,503 to Preiss, II et al. The antenna assembly includes two folded, U-shaped antennas, which may be dipoles or slot radiators, that are disposed orthogonally to one another to provide polarization diversity. Polarization diversity means that signals are transmitted and received on two different polarizations to increase the likelihood that the signal is received. Signals are carried to and from the antenna by microstrip feed lines. The microstrip lines are placed off center along each antenna slot to establish an acceptable impedance match for the antenna, and the feed lines are coupled to the communications card by coaxial cables.

Another exemplary wireless LAN antenna configuration is disclosed in U.S. Pat. No. 6,624,790 to Wong et al. This patent discloses first and second dual-band printed monopole antennas which are disposed orthogonally to one another on a substrate. The antenna elements are the same shape (i.e., an "F" shape). In particular, the antenna elements provide 2.4 GHz and 5.2 GHz WLAN operation.

There is an increasing trend toward using other portable, handheld communications devices in wireless LANs which are even smaller than laptops, such as personal digital assistants (PDAs) and cellular phones, for example. Accordingly, with even more restrictive space constraints for such handheld devices, there is a need for antennas which are appropriately sized for such applications yet still provide desired performance characteristics.

SUMMARY OF THE INVENTION

In view of the foregoing background, it is therefore an object of the present invention to provide a mobile wireless communications device including an antenna system which provides desired performance using frequency/pattern diversity and related methods.

This and other objects, features, and advantages in accordance with the present invention are provided by a mobile wireless communications device which may include a frequency/pattern diversity controller. The mobile wireless communications device may further include a portable housing, a wireless transceiver carried by the portable housing, and a plurality of antennas also carried by the portable housing. Each antenna may have a different gain pattern at a different respective operating frequency, and the antennas may have different shapes to define different gain patterns at a given operating frequency. Moreover, the frequency/pattern diversity controller may control the wireless transceiver to preferentially operate with the plurality of antennas.

More particularly, the frequency/pattern diversity controller may control the wireless transceiver to preferentially switch at least one antenna on and at least one antenna off for receiving signals. Thus, a given antenna may be selected for receiving if its respective gain pattern at the given operating frequency provides better reception than the other antennas. Alternately, the frequency/pattern diversity controller may control the wireless transceiver to preferentially weight received signals.

In addition, the frequency/pattern diversity controller may control the wireless transceiver to preferentially switch at least one antenna on and at least one antenna off for transmitting signals. Furthermore, each antenna may be designated for transmitting signals at different respective operating frequencies, and the frequency/pattern diversity controller may control the wireless transceiver to preferentially switch the antennas on and off for transmitting signals based upon a given operating frequency.

The different gain patterns may comprise different gain patterns for different polarizations in some embodiments. Further, each antenna may have a respective boresight aligned in a common direction. The mobile wireless communications device may further include a circuit board carried by the portable housing and carrying the wireless transceiver, and it may also carry the frequency/pattern diversity controller.

Moreover, at least one of the antennas may comprise a conductive trace on the circuit board. That is, at least one of the antennas may be carried within the portable housing. By way of example, the wireless transceiver may be a wireless local area network (LAN) transceiver.

A method aspect of the invention is for operating a mobile wireless communications device, such as the one described briefly above. The method may include controlling the wireless transceiver to preferentially operate with the plurality of antennas to provide frequency/pattern diversity.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notation is used to indicate similar elements or steps in different embodiments.

Figure 1:
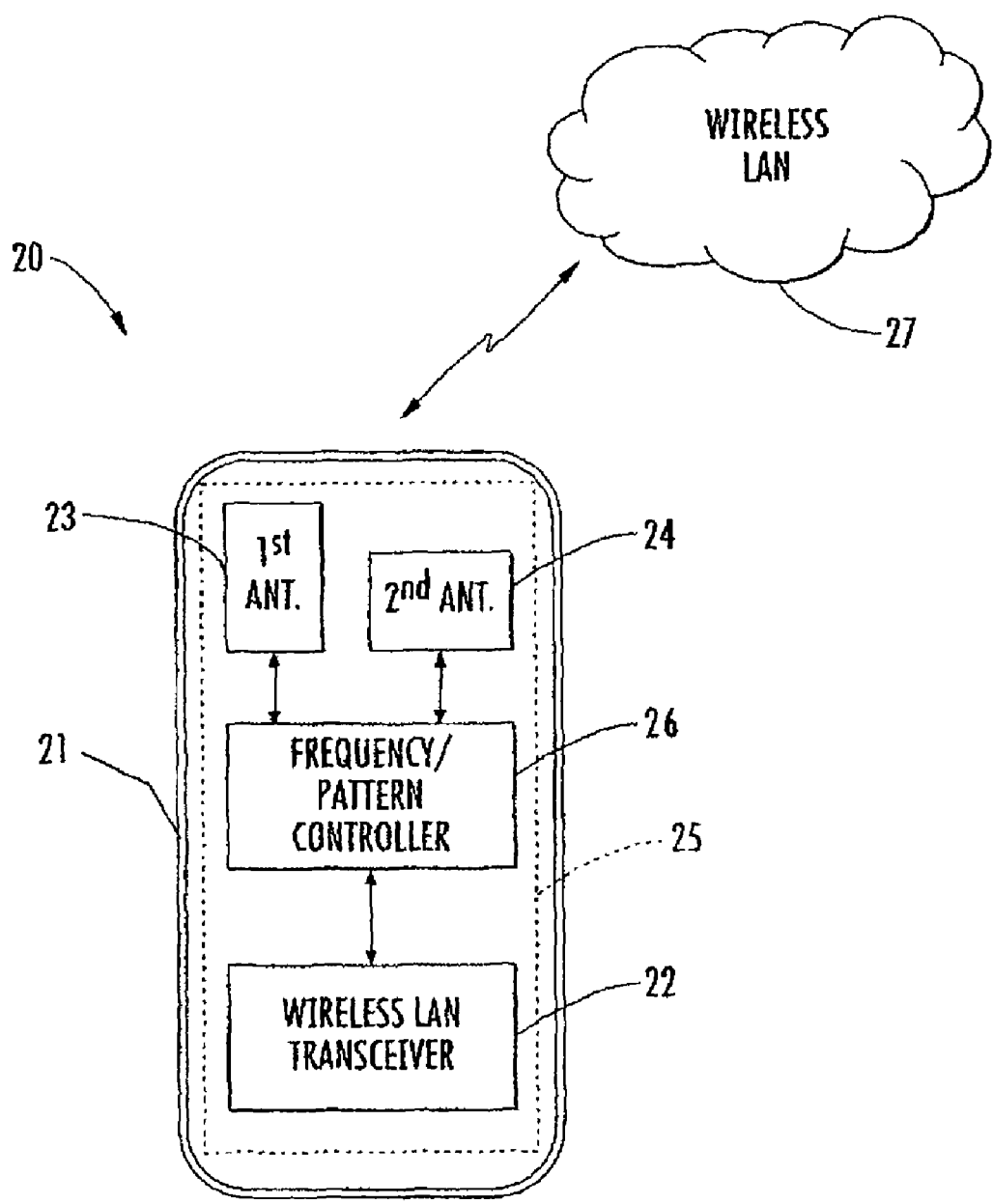
FIG. 1 is a schematic block diagram of a mobile wireless communications device in accordance with the present invention.
Figure 2:
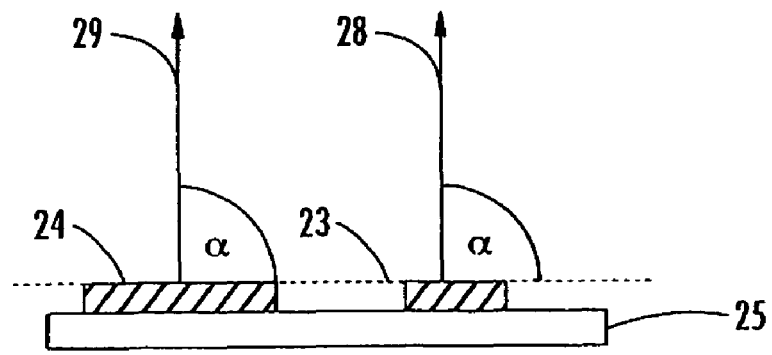
FIG. 2 is an end view of the circuit board of the mobile wireless communications device of FIG. 1 illustrating respective boresights of the antenna thereon.
Figure 3:
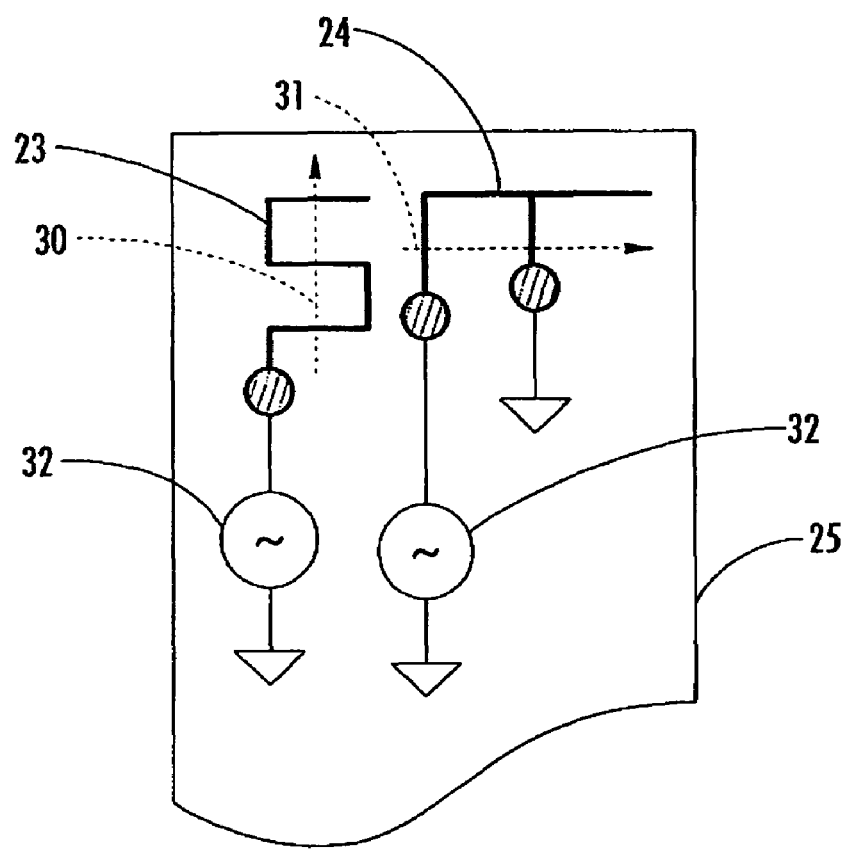
FIG. 3 is a front elevational view of an exemplary embodiment of the antennas of the mobile wireless communications device of FIG. 1 illustrating respective polarizations thereof.

Referring initially to FIGS. 1-3, a mobile wireless communications device 20 in accordance with the present invention illustratively includes a portable housing 21, a wireless transceiver 22 carried by the portable housing, and a plurality of antennas 23, 24 also carried by the portable housing. In the illustrated embodiment, the wireless transceiver 22 is a wireless local area network (LAN) transceiver for communicating over a wireless LAN 27. However, it should be noted that in other embodiments the mobile wireless communications device 20 may be used with other wireless communication networks, such as a cellular telephone network, for example. The antennas 23 and 24 are referred to herein as the first and second antennas, respectively, for clarity of explanation.

The wireless transceiver 22 and first and second antennas 23, 24 may be carried by a circuit board 25, such as a printed circuit board (PCB), for example. More particularly, the first and second antennas 23, 24 may comprise printed conductive traces on the circuit board 25. In other embodiments, the first and second antenna elements 23, 24 need not be on the circuit board 25, but may instead be on a separate antenna substrate, which need not be co-planar with the circuit board of course, portions of either antenna element 23, 24 may be on both the circuit board 25 and a separate antenna substrate. In still another embodiment, one or more of the antennas 23, 24 may be carried on the exterior of the housing 21, for example.

Despite the particular configuration in a given embodiment, each antenna 23, 24 preferably has a different gain pattern at a different respective operating frequency, and they preferably have different shapes to define different gain patterns at a given operating frequency. Moreover, the mobile wireless communications device 20 further illustratively includes a frequency/pattern diversity controller 26 for controlling the wireless transceiver 22 to preferentially operate with the antennas 23, 24. That is, the controller 26 advantageously provides frequency/pattern diversity by controlling the frequency and/or gain pattern used for either transmission or reception.

By way of example, the wireless LAN 27 may utilize multiple operating frequency bands such as a 2.4 GHz frequency band (i.e., approximately 2.4 to 2.483 GHz) and a 5 GHz frequency band (i.e., approximately 4.9 to 6 GHz), as will be appreciated by those skilled in the art. Because the 5 GHz frequency band is roughly double the 2.4 GHz frequency band, it is possible to make each of the antennas 23, 24 resonate in both frequency bands. This may be done by varying the effective length of the antennas 23, 24 using appropriate design techniques for the given antenna types used, as will be appreciated by those skilled in the art.

Thus, in accordance with the present example, both of the antennas 23, 24 are designed to resonate in both the 2.4 and 5 GHz frequency bands, but they each have different gain patterns in the two frequency bands, and the gain patterns of each antenna are different from the gain patterns of the other antenna at a given operating frequency. More particularly, the first antenna 23 is designed so that its maximum gain along its boresight 28 (FIG. 2) occurs at the 2.4 operating frequency, while the maximum gain of the second antenna 24 along its boresight 29 occurs at the 5 GHz operating frequency. Preferably, the respective boresights 28, 29 are aligned in a common direction, such as at a same angle α (e.g., 90°) with respect to the circuit board 25, as shown in FIG. 2. It should be noted that the antenna elements 23, 24 are shown with hatching in FIG. 2 for clarity of illustration, even though this is not a cross-sectional view.

As such, the frequency/pattern diversity controller 26 may control the wireless transceiver 22 to preferentially switch one of the antennas 23, 24 on and the other off for receiving signals based upon which antenna's gain pattern is providing the best reception. The frequency/pattern controller 26 may make this determination based upon signal strength or noise measurements, for example, as will be appreciated by those skilled in the art. Thus, a given one of the antennas 23, 24 may be selected for receiving if its respective gain pattern at the given operating frequency provides better reception than the other antenna.

Alternately, rather than using one of the antennas 23, 24 and not the other, the frequency/pattern diversity controller 26 may control the wireless transceiver 22 to preferentially weight received signals. Thus, based upon signal strength and noise considerations, for example, the frequency/pattern diversity controller 26 may control the wireless LAN transceiver to weight the signals received by each of the first and second antennas 23, 24.

The frequency/pattern diversity controller 26 may similarly control the wireless transceiver 22 to preferentially operate the antennas 23, 24 during transmission. That is, the frequency/pattern diversity controller 26 may control the wireless transceiver 22 to preferentially switch one of the antennas 23, 24 on and the other off for transmitting signals.

More particularly, each of the antennas 23, 24 may designated for transmitting signals at different respective operating frequencies.

For example, the first antenna 23 may be designated for transmitting in the 2.4 GHz frequency band, while the second antenna 24 may be designated for transmitting in the 5.2 GHz band, as will be discussed further below. Of course, both antennas 23, 24 could be used for transmitting signals and their outputs weighted, as similarly discussed for received signals above. Thus, the frequency/pattern diversity controller 26 may preferentially switch the antennas 23, 24 on and off for transmitting signals based upon the given operating frequency (i.e., the 2.4 GHz or 5 GHz frequency band) being used by the receiving wireless LAN device (e.g., an access point, etc.).

The mobile wireless communications device 20 therefore not only provides frequency/pattern diversity, but it may also provide polarization diversity in certain embodiments. That is, the different gain patterns of the first and second antennas 23, 24 may comprise different gain patterns for different polarizations. As shown in FIG. 3, for example, the first antenna 23 has substantially horizontal polarization as illustrated by a dashed arrow 30, while the second antenna 24 has a substantially vertical polarization as illustrated by a dashed arrow 31. Of course, other polarization arrangements may also be used.

In the illustrated example, the first antenna 23 is a monopole antenna with a single feed point connected to a signal source 32 (i.e., the wireless transceiver). The second antenna 24 is a slot inverted F antenna which has a first feed point connected to the signal source 32, and a second feed point connected to ground. The monopole antenna 24 has a meandering shape in the illustrated example, which may be used to change the effective length, for example. However, various other shapes (including a straight conductor) and antenna types may also be used in accordance with the present invention, as will be appreciated by those skilled in the art.

Because the first antenna 23 is a single feed antenna, it will have a stronger current flow on the circuit board 25 than the second antenna 24, it is well suited for providing the maximum gain along the boresight 28 at the 2.4 GHz operating frequency. On the other hand, because the antenna 24 has multiple feed points the current distribution on the circuit board 25 will be more limited, it is well suited for providing a maximum gain along the boresight 29 at the 5 GHz operating frequency, as will be appreciated by those skilled in the art. It should be noted that more than two antennas element may be used in some embodiments, and that in such embodiments the frequency/pattern diversity controller 26 need not control the wireless transceiver to preferentially operate all of such antennas. Moreover, the antennas 23, 24 need not always be adjacent the top of the device 20, e.g., one or more of the antennas may be adjacent the bottom of the device.

Figure 4:
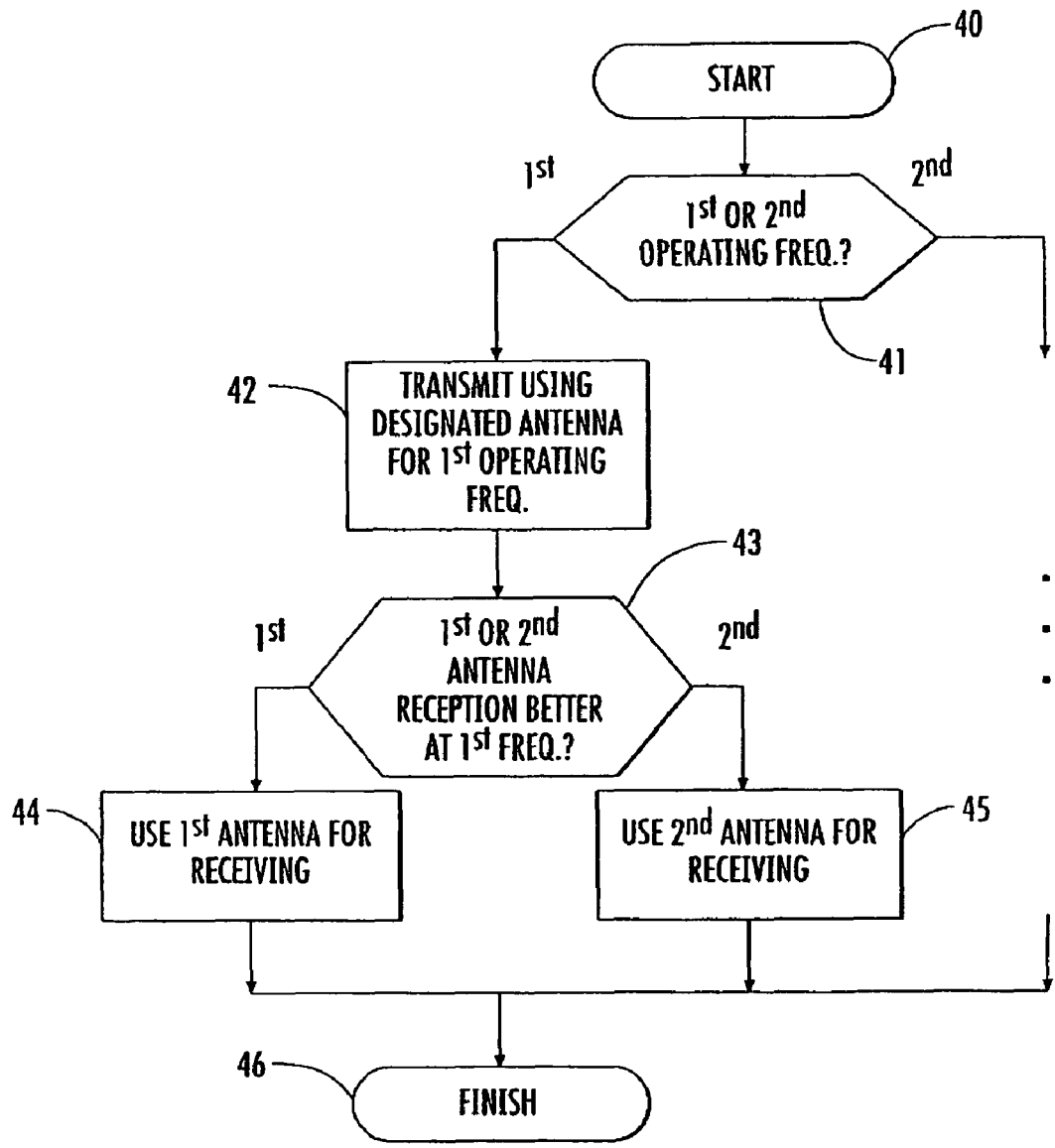
FIGS. 4 and 5 are flow diagrams illustrating methods of operating a mobile wireless communications device in accordance with the present invention.

A method aspect of the invention for operating the mobile wireless communications device 20 is now described with reference to FIG. 4. Beginning at Block 40, a determination is made as to which operating frequency or frequency band is to be used, at Block 41. Using the above noted example, when the device 20 is first turned on it may attempt to establish communications with the wireless LAN 27 over both the 2.4 and 5 GHz frequency bands, as will be appreciated by those skilled in the art. If the wireless LAN 27 is using the first (2.4 GHz) operating frequency band, then the first antenna 23 (which is the designated or default antenna for transmitting in this frequency band) is switched on and the second antenna 24 is switched off, at Block 42.

Furthermore, the frequency/pattern diversity controller 26 may determine which antenna 23, 24 is providing better reception, as discussed above, and switch that antenna on and the other off for receiving wireless signals, at Blocks 43-45, thus concluding the illustrated method (Block 46). Similar steps to those illustrated in Blocks 42-45 would be performed if the wireless LAN was using the second (5 GHz) operating frequency band (which are not shown in FIG. 4 for clarity of illustration) as will be appreciated by those skilled in the art.

Figure 5:
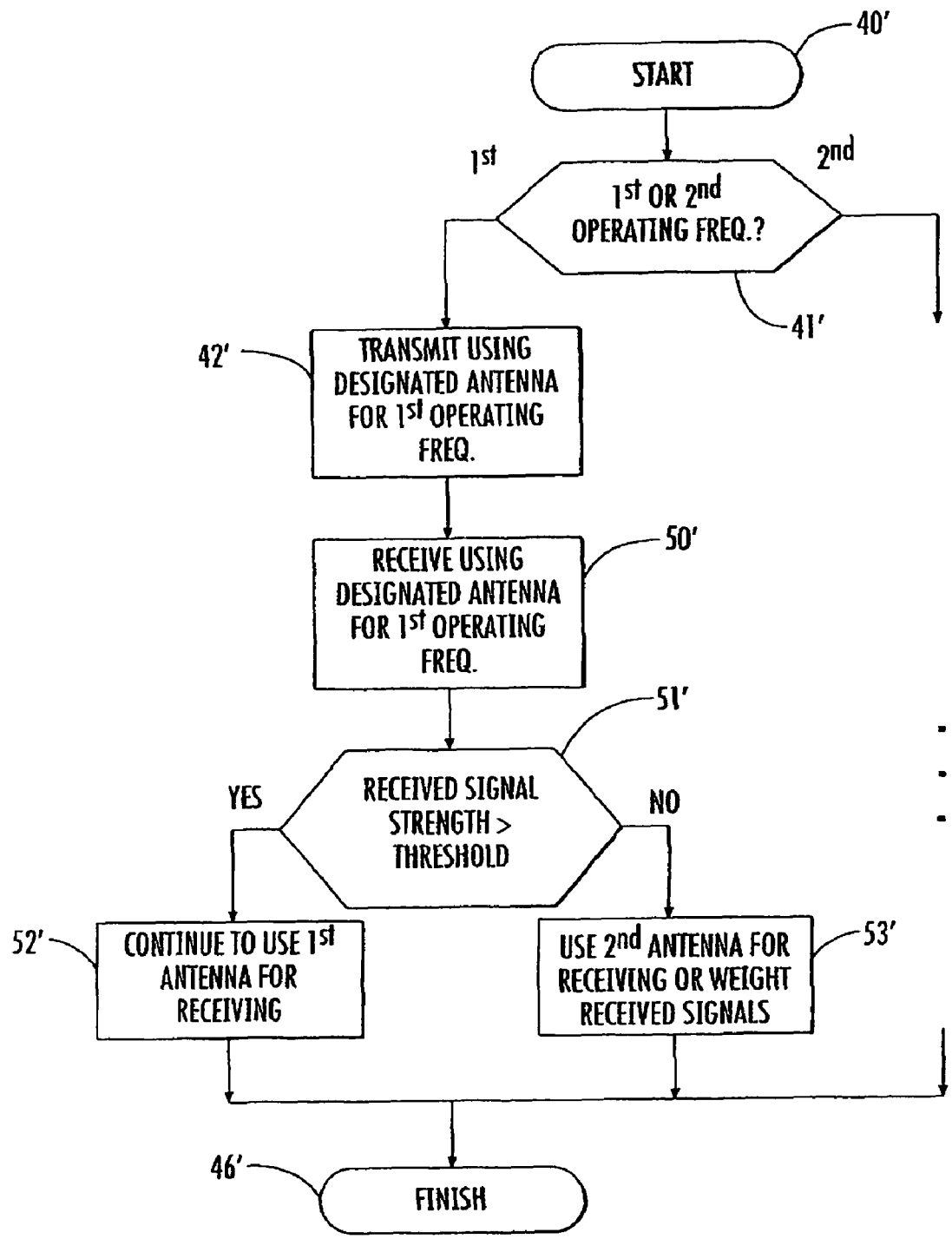

In an alternate embodiment illustrated in FIG. 5, rather than initially determining which antenna 23, 24 provides better reception as described above with reference to Block 43, each antenna may be designated as the initial (or default) receiving antenna for a given operating frequency band (e.g., the first antenna 23 for the 2.4 GHz frequency band, and the second antenna 24 for the 5 GHz frequency band), over that at Block 50'. If the reception quality (e.g., signal strength) using the default antenna 23 remains above a desired threshold over the first operating frequency band, at Block 51', then the first antenna would continue to be used, at Block 52'. However, if the received signal strength fell below the desired threshold, then the second antenna 24 may be used, or the received signals from both the first and second antennas weighted accordingly, at Block 53', as discussed further above. Of course, the above described method steps are merely exemplary, and different variations may be used in other embodiments. For example, the reception quality may be determined based upon whether a noise level or bit error rate exceeds a threshold, for example.

Figure 6:
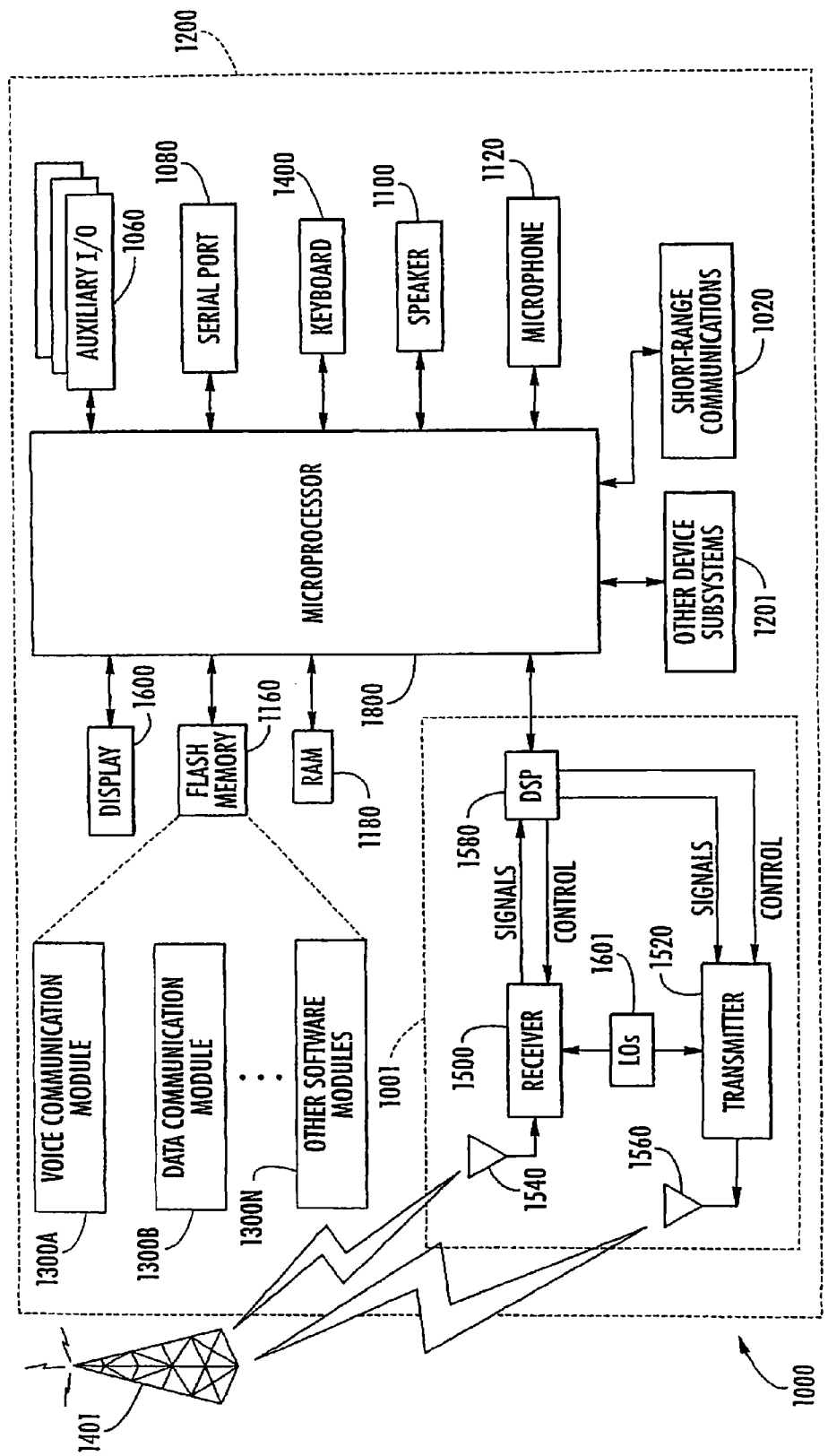
FIG. 6 is a schematic block diagram illustrating exemplary components of a mobile wireless communications device in accordance with the present invention.

Exemplary components which may be used in accordance with the present invention are now described with reference to a handheld mobile wireless communications device 1000 is shown in FIG. 6. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

In addition to the processing device 1800, other parts of the mobile device 1000 are shown schematically in FIG. 6. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
    a portable housing;
    a wireless transceiver carried by said portable housing;
    a plurality of antennas carried by said portable housing, each antenna for transmitting signals at different respective operating frequencies and receiving signals and having a different gain pattern at a different respective operating frequency, said antennas having different shapes to define different gain patterns at a given operating frequency and having respective maximum gains along respective boresights at different operating frequencies with the boresights being aligned in a common direction; and
    a frequency/pattern diversity controller for controlling said wireless transceiver to preferentially weight received signals from each of the plurality of antennas and to operate both of said plurality of antennas based upon respective ones of the weighted received signals.

2. The mobile wireless communications device of claim 1, wherein said frequency/pattern diversity controller controls said wireless transceiver to preferentially switch at least one antenna on and at least one antenna off for transmitting signals.

3. The mobile wireless communications device of claim 1 wherein said frequency/pattern diversity controller controls said wireless transceiver to preferentially switch said antennas on and off for transmitting signals based upon a given operating frequency.

4. The mobile wireless communications device of claim 1 wherein the different gain patterns comprise different gain patterns for different polarizations.

5. The mobile wireless communications device of claim 1 wherein at least one of said antennas is carried within said portable housing.

6. The mobile wireless communications device of claim 1 further comprising a circuit board carried by said portable housing and carrying said wireless transceiver.

7. The mobile wireless communications device of claim 1 wherein said wireless transceiver comprises a wireless local area network (LAN) transceiver.

8. A mobile wireless communications device comprising:
a portable housing;
a wireless transceiver carried by said portable housing;
a plurality of antennas carried by said portable housing, each antenna for transmitting signals at different respective operating frequencies and receiving signals and having a different gain pattern at a different respective operating frequency, said antennas having different shapes to define different gain patterns at a given operating frequency and having respective maximum gains along respective boresights at different operating frequencies with the boresights being aligned in a common direction, and each antenna being designated for transmitting signals at different respective operating frequencies; and
a frequency/pattern diversity controller for controlling said wireless transceiver to preferentially weight received signals from each of said plurality of antennas based upon at least one of noise and signal strength and to operate both of said plurality of antennas based upon respective ones of the weighted received signals, and to preferentially switch said antennas on and off for transmitting signals based upon a given operating frequency.

9. The mobile wireless communications device of claim 8 wherein the different gain patterns comprise different gain patterns for different polarizations.

10. The mobile wireless communications device of claim 8 wherein at least one of said antennas is carried within said portable housing.

11. A method of operating a mobile wireless communications device comprising a portable housing, a wireless transceiver carried by the portable housing, and a plurality of antennas carried by the portable housing, each antenna for transmitting signals at different respective operating frequencies and receiving signals and having a different gain pattern at a different respective operating frequency, and the antennas having different shapes to define different gain patterns at a given operating frequency and having respective maximum gains along respective boresights at different operating frequencies with the boresights being aligned in a common direction, the method comprising:
controlling the wireless transceiver to preferentially weight received signals from each of the plurality of antennas and to operate both of the plurality of antennas based upon respective ones of the weighted received signals to provide frequency/pattern diversity.

12. The method of claim 11 wherein controlling comprises controlling the wireless transceiver to preferentially switch at least one antenna on and at least one antenna off for transmitting signals.

13. The method of claim 11 wherein controlling comprises controlling the wireless transceiver to preferentially switch the antennas on and off for transmitting signals based upon a given operating frequency.

14. The method of claim 11 wherein the different gain patterns comprise different gain patterns for different polarizations.

* * * * *